United States Patent [19]

Duff

[11] 3,889,197

[45] June 10, 1975

[54] TIMER APPARATUS UTILIZING OPERATIONAL AMPLIFIER INTEGRATING MEANS

[75] Inventor: Thomas Guy Duff, Shrewsbury, N.J.

[73] Assignee: Bell Telephone Laboratories, Incorporated, Murray Hill, N.J.

[22] Filed: Apr. 12, 1974

[21] Appl. No.: 460,348

[52] U.S. Cl. .................. 328/55; 307/215; 307/229; 307/234; 307/293; 328/127; 328/129; 328/143

[51] Int. Cl. ...................... H03k 5/159; H03k 17/26

[58] Field of Search ........... 307/229, 234, 293, 215; 328/55, 127, 129, 143, 177

[56] References Cited

UNITED STATES PATENTS

| | | | |
|---|---|---|---|
| 3,419,784 | 12/1968 | Winn | 328/127 |
| 3,461,389 | 8/1969 | Whalen | 328/127 |
| 3,693,101 | 9/1972 | Trimble | 307/293 |
| 3,836,791 | 9/1974 | Galloway | 307/293 |

*Primary Examiner*—Stanley D. Miller, Jr.

*Attorney, Agent, or Firm*—G. E. Murphy

[57] ABSTRACT

A timer circuit which includes an operational amplifier integrator circuit and a voltage comparator is disclosed. The timer is responsive to input pulses of positive and negative polarity, and is relatively insensitive to spurious discontinuities in the input signal. The timer period is based on the linear integration period of the integrator circuit, with the comparator circuit sensing the presence or absence or virtual ground at the inverting input of the integrator circuit. Embodiments as an equal operate and release timer and as a pulse correction timer circuit are disclosed.

16 Claims, 9 Drawing Figures

FIG. 8

LOGIC LEVELS FOR THE OPERATION OF THE PULSE CORRECTION CIRCUIT WHEN INPUT SIGNAL, $V_{44}$, HAS A LOW PERCENT BREAK

| SIGNAL | TIME | | | | | | | | | | | |
|---|---|---|---|---|---|---|---|---|---|---|---|---|
| | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ |
| $V_{44}$ | 1 | 1 | 0 | 0 | 0 | 0 | 1 | 1 | 0 | 0 | 0 | 0 |
| $V_{28}$ | 1 | 1 | 1 | 0 | 0 | 1 | 1 | 1 | 1 | 0 | 0 | 0 |
| $V_{56}$ | 0 | 1 | 1 | 1 | 0 | 0 | 0 | 1 | 1 | 1 | 0 | 0 |
| $V_{11}$ | 1 | 1 | 1 | 0 | 0 | 0 | 1 | 1 | 1 | 0 | 0 | 0 |

FIG. 9

LOGIC LEVELS FOR THE OPERATION OF THE PULSE CORRECTION CIRCUIT WHEN INPUT SIGNAL, $V_{44}$, HAS A HIGH PERCENT BREAK

| SIGNAL | TIME | | | | | | | | | | | | | | |
|---|---|---|---|---|---|---|---|---|---|---|---|---|---|---|---|
| | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ |
| $V_{44}$ | 1 | 1 | 1 | 0 | 0 | 1 | 1 | 1 | 1 | 0 | 0 | 1 | 1 | 1 | 1 |
| $V_{28}$ | 1 | 1 | 0 | 0 | 0 | 0 | 1 | 1 | 0 | 0 | 0 | 0 | 1 | 1 | 0 |
| $V_{56}$ | 0 | 1 | 1 | 1 | 0 | 0 | 0 | 1 | 1 | 1 | 0 | 0 | 0 | 1 | 1 |
| $V_{11}$ | 1 | 1 | 1 | 0 | 0 | 0 | 1 | 1 | 1 | 0 | 0 | 0 | 1 | 1 | 1 |

TIMER APPARATUS UTILIZING OPERATIONAL AMPLIFIER INTEGRATING MEANS

BACKGROUND OF THE INVENTION

1. Field of the Invention

This invention relates to electronic timing circuits, and more particularly to time-delayed pulse circuits for providing output pulses which are delayed in time with respect to an applied input signal.

There are many applications in which it is necessary to introduce a time delay in an electronic signal. For example, in a circuit which performs a plurality of operations in predetermined timed sequence in response to a single input stimulus, a plurality of timers is often utilized so that each circuit operation, e.g., the activation of a relay, occurs a predetermined time after the input stimulus.

Moreover, it is often necessary to not only delay the activation of a device, but also necessary to delay the deactivation of the device. For example, it may be necessary to delay the activation of a particular relay a predetermined amount of time after an input pulse is applied, and to also delay the deactivation or release of the relay by an amount of time, which may or may not be equal to the operate delay, after the input signal is no longer applied.

2. Description of the Prior Art

Many circuits have been developed to introduce time delays, varying in complexity from simple monostable multivibrators to complex circuits which precisely generate a plurality of delayed signals. In applications requiring both an operate and release delay, the prior art has generally relied on separate timers to generate each delay, thereby increasing circuit complexity. Another limitation of many prior art timer circuits has been the inability to maintain the proper timing sequence when the input signal is momentarily interrupted due to spurious system conditions.

It is an object of this invention to provide a timer circuit which is capable of being utilized in a variety of timing situations.

It is a further object of this invention to provide a timer circuit which is capable of generating both an operate delay and a release delay.

It is a still further object of this invention to provide a timer circuit which is relatively unaffected by momentary interruptions or "splits" in the input signal.

It is yet another object of this invention to provide a timer circuit of simple circuit topology which is compatible with integrated circuit techniques and which generates a longer time delay for a given RC time constant than most prior art timer circuits.

SUMMARY OF THE INVENTION

In accordance with the principles of this invention, a conventional operational amplifier integrator circuit and a voltage comparator circuit are interconnected to effect an analog timing circuit. Basically, the integrator circuit integrates the input signal, while the comparator circuit detects the voltage at the inverting input of the integrator circuit and switches the timing circuit output voltage in response to the detected voltage.

It is well known to those skilled in the art that the inverting input of an operational amplifier integrator circuit is at essentially zero volts with respect to the noninverting input whenever the circuit is operating within the amplifier's linear region. This phenomenon, resulting from the necessary finite output signal and the high gain of the operational amplifier, is known as the virtual ground concept. Once the integrator circuit reaches saturation and ceases linear operation, however, the inverting input of the integrator does not remain at virtual ground, and the signal at the inverting input is usually determined by the input signal itself. By establishing the comparator threshold voltages so that the comparator is responsive to deviations from virtual ground, the present invention generates a time delay primarily determined by the time required for the integrator circuit to integrate from one saturation potential to the other saturation potential of the integrator amplifier.

BRIEF DESCRIPTION OF THE DRAWING

In the drawing:

FIGS. 8 and 9 illustrate the potentials of FIG. 5 in terms of binary quantities and further aid in understanding the operation of the pulse correction timer circuit of FIG. 5.

DETAILED DESCRIPTION

Figure 1:
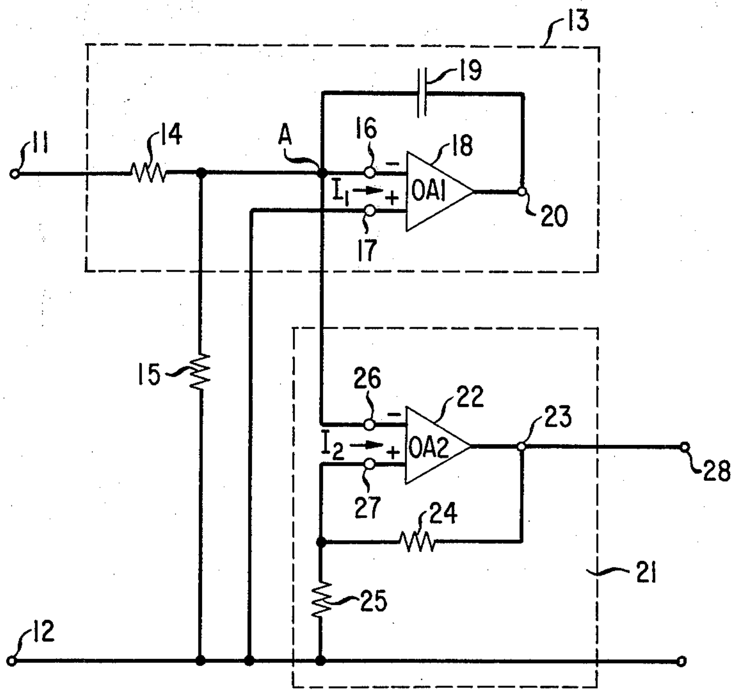
FIG. 1 schematically depicts a basic timer circuit in accordance with the principles of this invention.

In accordance with the principles of this invention, the circuit of FIG. 1 comprises an operational amplifier integrator circuit contained within outline 13 interconnected with a comparator circuit contained within outline 21. Integrator circuit 13 includes operational amplifier 18 which has an output terminal 20 and both an inverting and noninverting input terminal (16 and 17, respectively). Capacitor 19 is connected between amplifier output terminal 20 and circuit node A. Circuit node A is connected to amplifier inverting input terminal 16, and also to one terminal of summing resistor 14. The other terminal of resistor 14 is connected to timer input terminal 11. Noninverting input terminal 17 is connected to a terminal of fixed potential 12, which is usually at ground potential. Resistor 15 is connected between that terminal of summing resistor 14 which connects to circuit node A, and terminal 12.

Comparator 21 includes operational amplifier 22 and resistors 24 and 25. Resistor 24 is connected between output terminal 23 and noninverting input terminal 27 of operational amplifier 22. Resistor 25 is connected between noninverting input terminal 27 and terminal 12. Output terminal 23 of operational amplifier 22 is also connected to timer output terminal 28. Inverting input 26 of operational amplifier 22 connects to circuit node A of integrator circuit 13.

It will be recognized by those skilled in the art that comparator circuit 21 has two distinct threshold voltages, one for each of the two comparator output states, due to the positive feedback provided by the resistor 24-resistor 25 voltage divider. This feature, commonly termed switching hysteresis, although not essential to the basic timer operation, has proven advantageous, and it should be realized, upon understanding the following description of the circuit operation, that the two separate threshold voltages can be utilized to ensure that comparator 21 does not change states before the desired timing interval is complete.

Figure 2:
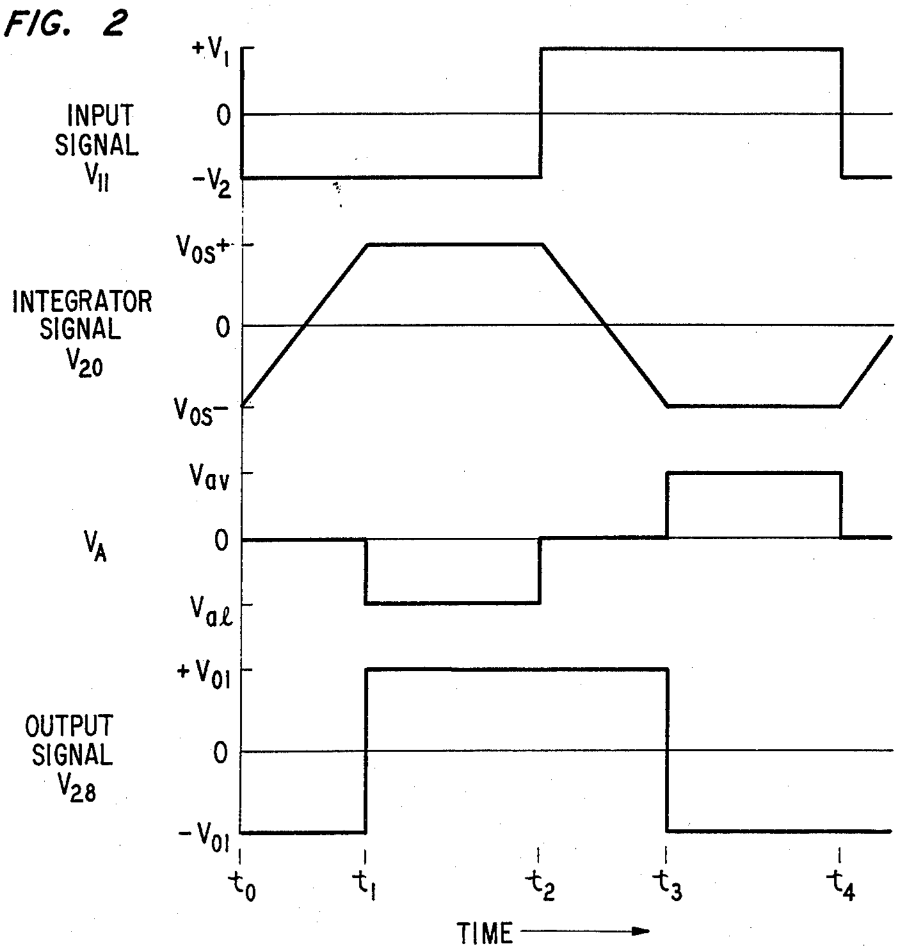
FIG. 2 illustrates the timing sequence of the potentials at various points within the timer circuit of FIG. 1.

The operation of the circuit of FIG. 1 may be best understood when considered in conjunction with the timing sequence illustrated by FIG. 2. In FIG. 2 input signal $V_{11}$ depicts a typical signal applied between circuit input terminal 11 and terminal 12. Integrator signal $V_{20}$ depicts the signal appearing at amplifier 18 output terminal 20 during a normal timing sequence. Signal $V_A$ depicts the signal appearing at circuit node A. Output signal $V_{28}$ depicts the timer output signal appearing between timer output terminal 28 and terminal 12.

For convenience, the signals of FIG. 2 have been arbitrarily assumed to begin at time $t_o$ with a transition of input signal $V_{11}$ from the positive voltage level $+V_1$ to the negative voltage level $-V_2$. As shown, integrator signal $V_{20}$ begins to linearly increase from the negative saturation voltage $V_{OS-}$, which is assumed to have resulted from a positive input signal immediately prior to time $t_o$, toward a more positive potential, whereas $V_A$ is substantially at zero volts due to the virtual ground at circuit node A. Output signal $V_{28}$ remains at negative level $-V_{01}$ as it was immediately prior to $t_o$, since $V_A$ is at virtual ground and is thus more positive than the negative reference potential at noninverting input 27 of comparator amplifier 22, which is essentially $-R_{25}/R_{24}+R_{25}\ V_{01}$. At time $t_1$, integrator signal $V_{20}$ reaches positive saturation voltage $V_{OS+}$. As the integrator enters saturation, circuit node A cannot remain at virtual ground and begins to go negative, reaching negative potential $V_{al}$ which is primarily determined by the ratio of resistor 14 and resistor 15 and the value of input level $-V_2$. Since the magnitude of $V_{al}$ is established so that it is greater than the magnitude of the reference potential at noninverting input 27 of comparator amplifier 22, comparator circuit 21 changes states. Thus, the potential at terminal 28 reaches a voltage of $+V_{01}$. While the input signal $V_{11}$ remains at $-V_2$, integrator signal $V_{20}$ remains at potential $V_{OS+}$ and the potential at circuit node A remains at $V_{al}$.

It should be recognized that as output signal $V_{28}$ switches to a voltage level of $+V_{01}$ volts, the reference voltage at amplifier noninverting input terminal 27 of comparator circuit 21 changes to a positive voltage, becoming substantially $R_{25}/R_{24}+R_{25}\ V_{01}$. Thus, comparator 21 cannot switch the level of output signal $V_{28}$ back to a level of $-V_{01}$ until signal $V_A$ becomes more positive than this new reference voltage.

At time $t_2$, input signal $V_{11}$ makes a transition from voltage level $-V_2$ to $+V_1$. Integrator circuit 13 then begins to integrate downward, causing integrator signal $V_{20}$ to linearly decrease until it reaches negative saturation level $V_{OS-}$ at time $t_3$. During this period, circuit node A is again at virtual ground, causing voltage $V_A$ to again be essentially zero volts. At time $t_3$, integrator signal $V_{20}$ reaches negative saturation voltage $V_{OS-}$ and voltage $V_A$ departs from zero, reaching a positive voltage level $V_{au}$. This voltage transition triggers comparator circuit 21, since voltage $V_{au}$ is established such that it is greater than the reference voltage at noninverting input 27 of comparator amplifier 22. Accordingly, output signal $V_{28}$ changes states from $+V_{01}$ to $-V_{01}$. Integrator output $V_{20}$ remains at $V_{OS-}$ and signal $V_A$ remains at level $V_{au}$ until input $V_{11}$ changes state at time $t_4$. At time $t_4$ all potentials reach the same condition as was exhibited at time $t_o$. Thus, it can be seen from FIG. 2 that the period $t_o$ to $t_4$ represents a complete input cycle and it can be noted that output signal $V_{28}$ is an inverted replica of input signal $V_{11}$ with operate and release delays of $t_1-t_o$ and $t_3-t_2$ respectively.

It can be recognized that where one polarity excursion of input signal $V_{11}$ represents the operate signal and the opposite polarity excursion represents the release signal, the timer has provided both an operate and release delay. It may further be recognized that, although the explanation of the circuit has been from the standpoint of an input signal having both positive and negative excursions, a timer which responds to an input signal comprising solely of a positive excursion or alternately a negative excursion can be constructed by proper control of the comparator trigger voltages.

It should be noted that since the timing period $t_1-t_0$ or $t_3-t_2$ is basically comprised of the linear integration period of integrator 13, short duration discontinuities or "splits" in input signal $V_{11}$ will have a minimal effect on the timer operation. For example, if a short-term split occurred during the time interval between $t_o$ and $t_1$ in FIG. 2, the minor error in the timing period would essentially be equal to the integral of the discontinuity. If a split occurred during a period when integrator circuit 13 was saturated, however, say during the time interval $t_1$ to $t_2$ in FIG. 2, there would be substantially no error introduced in the timing period as long as integrator circuit 13 has adequate time to recover, i.e., integrate back to the original saturated state before the next input transition occurred.

It can be shown that the timing period for a positive-going excursion of input signal $V_{11}$, i.e., during time period $t_2$ to $t_3$, is essentially the time required to integrate between the positive and negative saturation voltages, $V_{OS+}$ and $V_{OS-}$, respectively. This interval may be expressed as $$T_1 = \frac{V_{OS+} - V_{OS-}}{V_1 - V_{I0}\left(1 + \frac{R_{14}}{R_{15}}\right) - R_{14}(I_1 + I_2)} R_{14} C_{19} \qquad (1)$$

where $I_1$ and $I_2$ are, respectively, the bias currents flowing into inverting input terminals 16 and 26 of amplifiers 18 and 22 and $V_{10}$ is the amplifier offset voltage. Similarly the timing period is essentially $$T_1' = \frac{V_{OS+} - V_{OS-}}{V_2 + V_{I0}\left(1 + \frac{R_{14}}{R_{15}}\right) + R_{14}(I_1 + I_2)} R_{14} C_{19} \qquad (2)$$

for a negative-going excursion of input signal $V_{11}$, i.e., during the time period $t_o$ to $t_1$.

Equations (1) and (2) disclose that the basic timing period is somewhat affected by the parameters of operational amplifiers 18 and 22, specifically input offset voltage $V_{10}$ and input bias currents $I_1$ and $I_2$. However, worse case analysis for typical circuit components has shown that these parameters usually affect the timing duration by no more than two per cent. In addition, these device characteristics can be compensated for in many well-known manners, for example, by replacing the direct connection of FIG. 1 between the noninverting amplifier input 17 and terminal 12 with an appropriate value resistor. In any case, Equations (1) and (2) provide an adequate mathematical description which enables the designer to compensate for the time factor introduced by the parameters of amplifier 18, or, alternately, to minimize the effect of these parameters to judicious selection of amplifier 18 or the inclusion of compensation circuitry.

Equations (1) and (2) not only reveal the basic timing period involved in the present invention, but also point out several important features. First, it becomes apparent from Equations (1) and (2) that the equal operate and release delays produced by the circuit of FIG. 1 are both determined by the same circuit components, in particular, capacitor 19 and resistor 14. Thus, timer distortion, i.e., the difference between the operate and release times, is minimized. Secondly, since the full dynamic range of integrator operational amplifier 18 is utilized, the desired time delay is achieved with a minimum RC product. This, of course, is important not only in integrated circuit embodiments, but also in discrete embodiments in which capacitor 19 can easily be the largest and most costly element. Thus, the embodiment of FIG. 1 not only provides a timer circuit capable of suppplying both operate and release delays, but a timer having substantial advantages over other prior art circuits. Moreover, as will become clear in discussing the embodiments of the present invention depicted in FIG. 3, FIG. 4 and FIG. 5, the principles of this invention may be applied to many diverse timing applications.

In some applications, it has been found especially advantageous to construct the timer circuit of FIG. 1 with an integrated circuit dual operational amplifier, using one of the amplifiers as integrator amplifier 18 and the second amplifier as comparator amplifier 22. In such a case, one can express the timing period as $$T_1 = \frac{V_s - K_+ - K_-}{\frac{1}{2}V_s - K_- - V_D} R_{14}\, C_{19} \qquad (3)$$

for the integration delay due to a positive excursion of input signal $V_{11}$, and $$T_1 = \frac{V_s - K_+ - K_-}{\frac{1}{2}V_s + K_+ + V_D} R_{14}\, C_{19} \qquad (4)$$

for the integration delay due to a negative excursion of input signal $V_{11}$, where, in each of the equations, $$V_D = V_{IO}\left[1 + \frac{R_{14}}{R_{15}}\right] + R_{14}\left[I_1 + I_2\right],$$

$V_s$ is the bias voltage supplied to operational amplifier 18, and $K_+$ and $K_-$ are constants which relate the saturation limits of amplifier 18 to the amplifier supply voltage such that $V_{OS+} = \frac{1}{2}V_s - K_+$, and $V_{OS-} = \frac{1}{2}V_s + K_-$.

It will be recognized that since both denominator and numerator of these equations contain the K terms, the timing period is essentially free from variations caused by changes in either power supply voltage or variations in the output voltage swing of the operational amplifier. It has been found, in fact, that a change of ±0.2 volts in $K_+$ or $K_-$ typically causes an integration delay change of less than 1 per cent. Further, a 5 per cent change in the supply voltage has typically been found to change the integration delay by less than 0.05 per cent. Furthermore, since the timing equations for a negative and positive input signal utilize a single RC time constant ($R_{14}\, C_{19}$), the difference between the operate and release integration delays is independent of the primary timing components.

Figure 3:
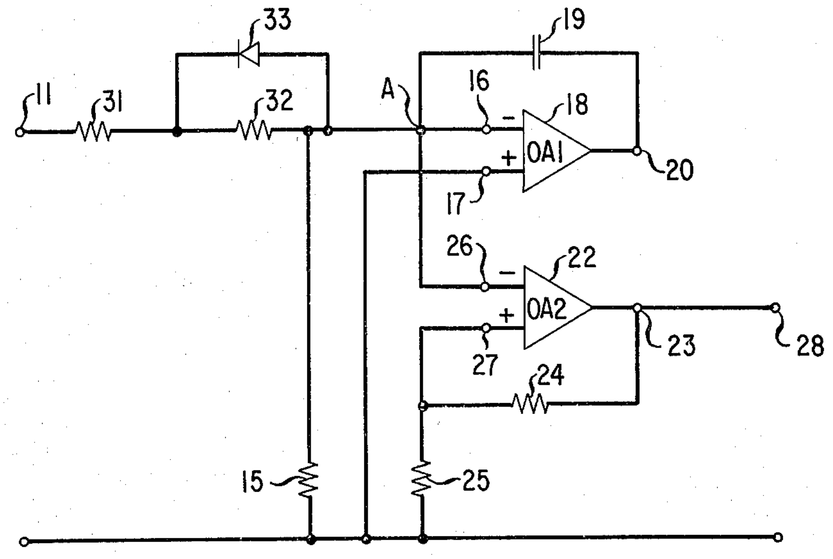
FIG. 3 depicts a first embodiment of the present invention which provides prescribed unequal operate and release delay intervals.
Figure 4:
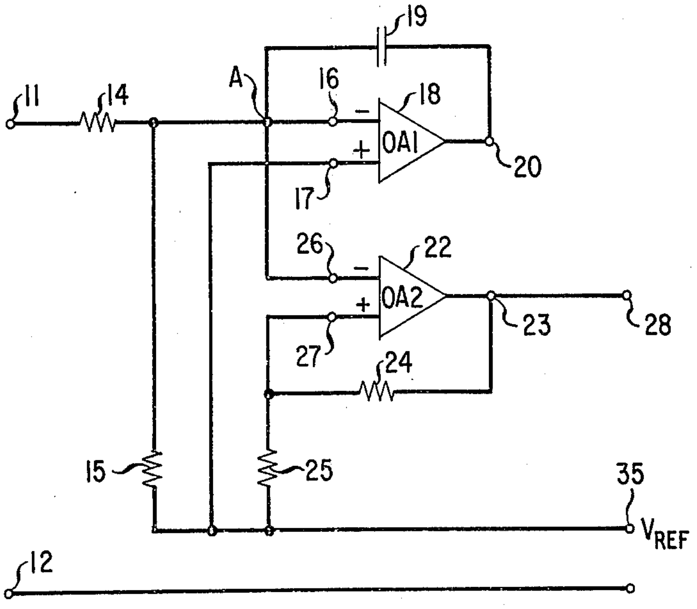
FIG. 4 depicts a second embodiment of the present invention which provides prescribed unequal operate and release delay intervals.

FIG. 3 and FIG. 4 disclose circuits in accordance with the present invention which provide unequal but predetermined operate and release delays in response to a rectangular input signal. It will be realized that the circuits of FIG. 3 and FIG. 4 basically operate in the same manner as the previously described circuit of FIG. 1. In the circuits of FIG. 3 and FIG. 4, however, the integration rate of the integrator when input signal $V_{11}$ is positive is established so that it is not equal to the integration rate when input signal $V_{11}$ is negative. Thus, the integration rate, or the rate of change of integrator signal $V_{20}$ depends on the polarity of the input signal, and the time required to integrate between the saturation limits $V_{OS+}$ and $V_{OS-}$ is thus not equal to the time required to integrate from $V_{OS+}$ to $V_{OS-}$. Accordingly, separate predetermined operate and release delays are established.

The embodiment of FIG. 3 provides different integration delays for positive and negative signals by utilizing diode 33 to control the effective value of the integrator summing resistor. It can be observed from FIG. 3 that the current which charges capacitor 19 essentially flows through resistor 31 and diode 33 during periods of time that input signal $V_{11}$ is negative and flows through resistors 31 and 32 during those periods of time that input signal $V_{11}$ is positive. Accordingly, the time delay for the circuit depicted by FIG. 3 may be obtained by substituting $R_{31}$ in place of $R_{14}$ in Equation (2) to obtain the delay for a negative input signal, and substituting $(R_{31} + R_{32})$ in place of $R_{14}$ in Equation (1) to obtain the delay for a positive input signal.

Unequal operate and release times can also be obtained with the subject timer circuit by supplying a reference potential, $V_{REF}$, to noninverting inputs 17 and 27 of integrator amplifier 18 and comparator amplifier 22. As illustrated in FIG. 4, one method of supplying reference voltage $V_{REF}$ is to connect resistors 15 and 25 to a second terminal of fixed potential 35, rather than to terminal 12 which, although being a terminal of fixed potential, necessarily serves as circuit common.

Referring to FIG. 4, it will be recognized that the magnitude of the charging current through capacitor 19 when input $V_{11}$ is equal to $+V_1$ is essentially $$I_{C19+} = \frac{V_1 + V_{REF}}{R_{14}}$$

and similarly when the input level of signal $V_{11}$ is equal to $-V_2$ the magnitude of the charging current is essentially $$I_{C19-} = \frac{V_2 - V_{REF}}{R_{14}}.$$

It may be noted that these equations, in conjunction with the equations describing the basic embodiment of FIG. 1, demonstrate that a wide range of unequal operate and release times is realizable.

Figure 5:
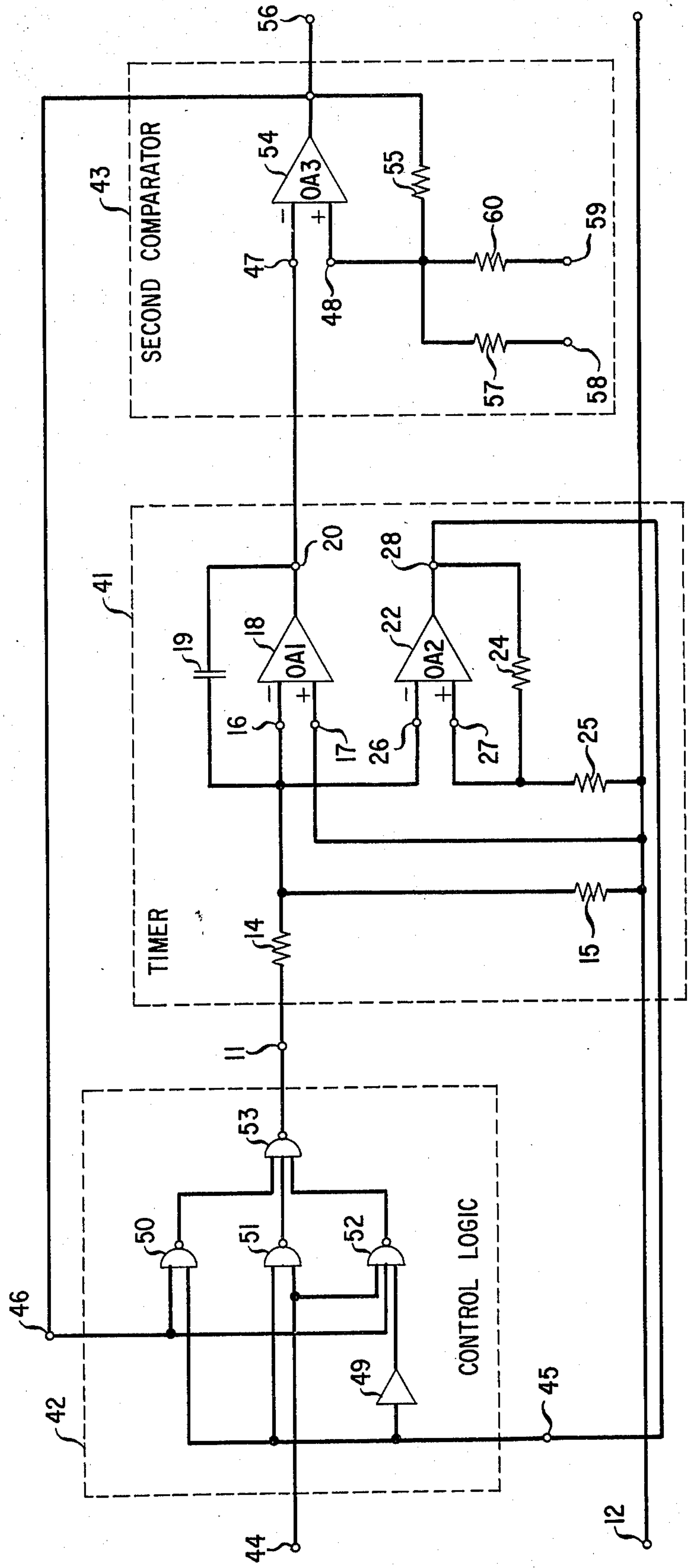
FIG. 5 depicts an embodiment of the present invention which serves as a pulse correction or duty-cycle restoration circuit.

FIG. 5 depicts a pulse correction circuit in accordance with the present invention. Pulse correction circuits are a type of timer circuit utilized to restore a predetermined minimum duty cycle or minimum make-break ratio to a periodic rectangular input signal such as the rotary dial signals utilized in many telephone systems. Typically, one voltage level of the input signal represents the make condition or closed condition of the sending contacts, whereas the second voltage level of the input signal represents the break condition or the open condition of the sending contacts. Pulse correction circuits are often necessitated because of distortion which occurs when a pulse signal is transmitted long distances over conventional telephone circuits.

As shown in FIG. 5, a pulse correction circuit in accordance with the present invention comprises the timer circuit of FIG. 1, denoted as element 41, interconnected with control logic unit 42 and a second signal comparator 43. In the pulse correction circuit of FIG. 5, integrator amplifier terminal 20 is connected to the inverting terminal 47 of operational amplifier 54 and noninverting input terminal 48 of operational amplifier 54 is connected to a reference voltage which is established at the junction of resistors 57 and 60. Output terminal 56 of operational amplifier 54 serves as the output terminal of the pulse correction circuit and is also connected to input terminal 46 of control logic 42. Output terminal 28 of operational amplifier 22 is connected to input terminal 45 of control logic 42.

Control logic 42 may be any circuit which performs the Boolean operation $V_{28}V_{44} + V_{28}V_{56} + \overline{V_{28}}V_{44}V_{56}$, where each term represents the signal appearing at the particular terminal designated by the subscript and the positive most potential of each signal is considered to be the logical one state. One embodiment which saatisfactorily performs the required logic operation is shown within the dashed outline of control logic 42 in FIG. 5. This circuit includes NAND gates 50, 51, 52, and 53 in conjunction with inverter 49. The NAND gates are interconnected so that logic input terminal 45 is connected to the input of inverter 49 and one input of both NAND gates 50 and 51. The second input of NAND gate 50 is connected to logic input terminal 46 and the second input of NAND gate 51 is connected to pulse corrector input terminal 44. The inputs of three input NAND gate 52 are connected to the output of inverter 49, logic input terminal 46, and pulse corrector input terminal 44. The inputs of three input NAND gate 53 are connected to the output of NAND gates 50, 51, and 52. The output of NAND gate 53 serves as the output of control logic 42 and is connected to timer input terminal 11.

It can readily be seen that second comparator 43 is a conventional operational amplifier voltage comparator incorporating operational amplifier 54, resistor 55 connected between output terminal 56 and noninverting input terminal 48 of amplifier 54 and a voltage divider comprising resistors 60 and 57 connected between two terminals of fixed potential, 58 and 59, with the common node of resistors 60 and 57 connected to amplifier noninverting input 48 to supply a suitable reference signal.

Figure 6:
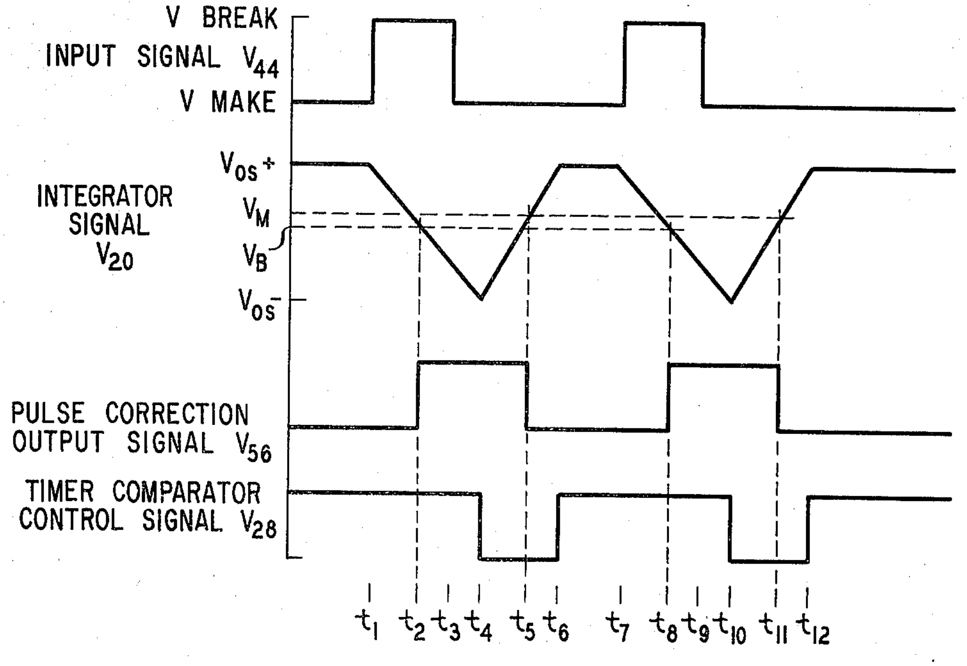
FIGS. 6 and 7 illustrate the circuit potentials in the pulse correction timer circuit of FIG. 5.

Although many comparator circuits can satisfactorily provide the function of second comparator 43, it will be recognized upon considering the pulse corrector of FIG. 5 in conjunction with the operating sequence illustrated in FIG. 6 that it is necessary for comparator 43 to include two separate controllable threshold voltages.

The operation of the pulse corrector circuit may be best understood by considering the circuit diagram of FIG. 5 in conjunction with FIG. 6 through FIG. 9 which depict the timing sequence and logic levels for both an input signal having an undesirably low percentage break, i.e., a low break-to-make ratio, and an input signal having an undesirably high percentage break, i.e., a high break-to-make ratio.

In FIG. 6 input signal $V_{44}$ has a low percentage break ratio, the time intervals of the positive-most signal level depicting the break period and the time interval of the most negative potential depicting the make period. At time $t_1$ pulse corrector input signal $V_{44}$ switches from its negative-most level to its positive-most level, or in terms of the logic levels of control logic unit 42, from the logical zero state to the logical one state. At this time, pulse corrector output signal $V_{56}$ is at the most negative state, or logical zero, and timer comparator signal $V_{28}$ is at its most positive signal level, or logical one. Thus, applying the Boolean equation which expresses the operation of control logic 42, it can be seen that timer signal $V_{11}$ is at its positivemost level, and, accordingly, integrator output signal $V_{20}$ is a linearly decreasing signal. For convenience, the logic level at terminals 44, 28, 56, 11, and 20 at time $t_1$ and all consequent times of importance are given in FIG. 8. At time $t_2$, integrator signal $V_{20}$ reaches voltage level $V_B$ which is the first preselected threshold voltage of second comparator 43. Accordingly, pulse corrector output $V_{56}$ goes from the most negative state to the most positive state. As may be ascertained from the Boolean expression of FIG. 6, no changes take place in either timer comparator signal $V_{28}$ or in integrator signal $V_{20}$. At time $t_3$, input signal $V_{44}$ changes from the break condition, or positive-most level, to the make condition, or negative-most level. Although this transition applies a logical zero to input terminal 46 of control logic 42, no significant change takes place. At time $t_4$however, integrator signal $V_{20}$ reaches negative saturation voltage $V_{OS-}$ causing the inverting input 16 of integrator amplifier 18 to depart from virtual ground, in turn causing timer comparator signal $V_{28}$ to switch to its negative-most level or logical zero state. As shown in FIG. 8, this causes timer signal $V_{11}$ to switch to its negative potential and the timer accordingly begins to integrate linearly upward from $V_{OS-}$. At time $t_5$ integrator signal $V_{20}$ reaches voltage level $V_M$, the second preselected threshold voltage of second comparator 43. Accordingly, pulse corrector output $v_{56}$ switches from its positive-most level to its negative-most level. It will be seen by referring to FIG. 8 or to the Boolean expression for control logic 42 that no other important signal changes take place at this time. At time $t_6$, integrator signal $V_{20}$ reaches positive saturation level $V_{OS+}$ and the inverting input terminal 16 of integrating amplifier 18 again departs from virtual ground, causing control signal $V_{28}$ to switch from logical zero to logical one. This changes the input applied to input terminal 45 of control logic 42, but causes no significant changes in the relevant circuit potentials. At time $t_7$, however, input signal $V_{44}$ switches from the make condition, or negative-most potential, to the break condition, or positive-most potential, thereby changing the logical signal applied to control logic 42. This causes the signal at timer terminal 11 to switch to the positive-most potential and timer 41 begins to integrate downward from positive potential $V_{OS+}$. At time $t_8$, the integrator signal $V_{20}$ again reaches first threshold voltage $V_B$ of second comparator 43, and pulse corrector output $V_{56}$ accordingly switches from the negative-most potential to the positive-most potential. At time $t_9$, pulse corrector input signal $V_{44}$ again switches from the break condition to the make condition. As shown by FIG. 6 and FIG. 8, this change does not affect pulse corrector output signal $V_{56}$. At time $t_{10}$, integrator signal $V_{20}$ again reaches negative saturation voltage $V_{OS-}$ which, in turn, causes timer comparator signal $v_{28}$ to go from the logical one state to the logical zero state, which, in turn, causes $V_{20}$ to linearly increase. No changes in output signal $V_{56}$ occur, however, until the integrator circuit has integrated upward from $V_{OS-}$ to second comparator threshold voltage $V_M$ at time $t_{11}$. At this time, second comparator 43 again changes state, causing pulse correction output signal $V_{56}$ to switch from its positive-most potential to its negative-most potential. At time $t_{12}$, integrator signal $V_{20}$ again reaches positive saturation voltage $V_{OS+}$ which accordingly causes the voltage at amplifier inverting input 16 to depart from virtual ground and reach a positive potential. This change causes no other changes in the relevant circuit potentials.

This description, which encompasses slightly more than a full cycle of the timing sequence of the pulse correction circuit for input signals having a low percentage break ratio (low duty-cycle), readily demonstrates that the minimum break period established by the pulse correction circuit is equal to $t_5$—$t_2$. It can be observed that this break period establishes a duty-cycle of $(t_5—t_2)/(t_7—t_1)$. Since times $t_2$ and $t_5$ are determined by the first and second threshold voltages of second comparator 43 ($V_B$ and $V_M$, respectively) virtually any suitable minimum break period (or minimum duty-cycle) can be established.

Figure 7:
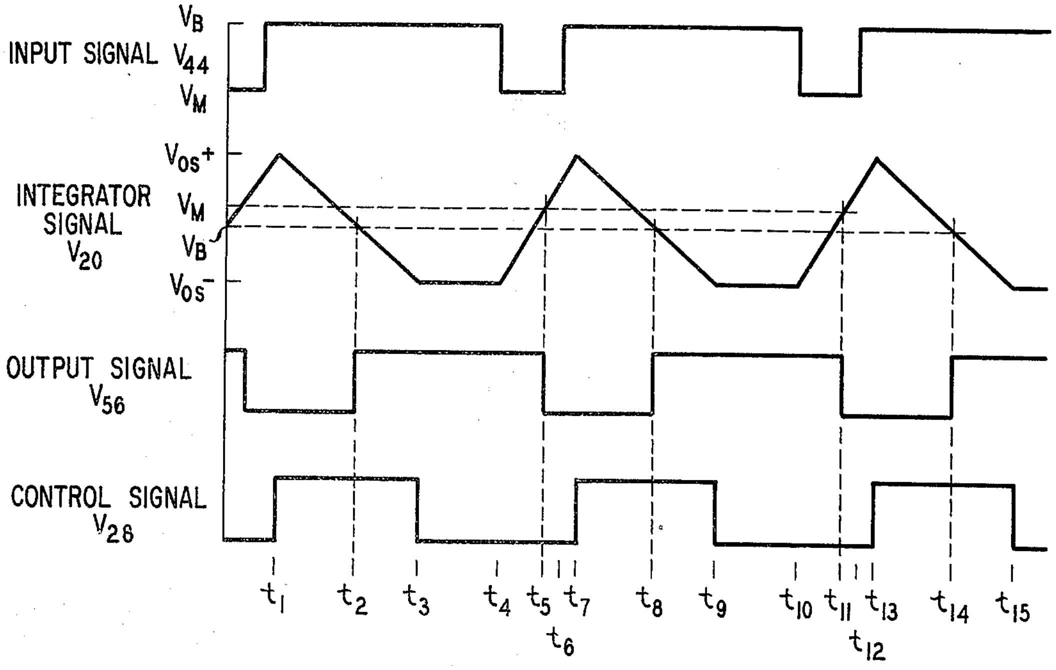

FIGS. 7 and 9 demonstrate the performance of the pulse correction circuit for an input signal having a high percentage break (high duty-cycle). It may be readily seen that the sequence of operation is essentially the same as described by FIG. 6 and FIG. 8, and in the case of a signal having a high percentage break the minimum make period of output signal $V_{56}$ is determined by that period of time required for the timer to integrate from second threshold voltage $V_M$ of second comparator 43 to positive saturation level $V_{OS+}$ and that period of time required to integrate from $V_{OS+}$ to first threshold voltage $V_B$ of second comparator 43. Thus, the minimum make period, as shown by FIG. 7, is equal to $t_8$— $t_5$. Examining FIG. 6B and FIG. 7B, it can be recognized that the output signal duty-cycle established for an input signal having a high duty-cycle is $$\frac{t_{10} - t_8 + t_5 - t_4}{t_{10} - t_4}.$$

In view of the foregoing description of the circuit of FIG. 5, it should be well understood that any reasonable prescribed minimum break and make period, or duty-cycle, may be established by controlling the timing durations of timer 41 as previously described and by controlling threshold voltages $V_B$ and $V_M$ of second comparator 43.

What is claimed is:

1. A circuit for developing an output signal a predetermined time after the application of an applied input signal comprising:

integration means, responsive to said applied signal, having a predetermined linear range of integration in which said integrator develops a signal representative of the mathematical integral of said applied signal, said integration means developing a signal at a terminal thereof which is at virtual ground only when said integration means is within said linear range of integration; and comparator means responsive to the difference between said signal at said terminal and an applied reference signal for developing said output signal.

2. The circuit of claim 1 wherein the magnitude of said applied reference signal is proportional to the magnitude of the output signal of said comparator means.

3. A timer circuit comprising:

integrator means exhibiting a first range for linearly integrating a positive signal applied to said timer circuit and exhibiting a second range for linearly integrating a negative signal applied to said timer circuit, said integrator means further exhibiting a first saturated state when the integral of said positive applied signal is outside said first linear integration range and a second saturated state when the integral of said negative applied signal is outside said second linear integration range, said integrator means developing an indication signal which is at virtual ground whenever said integrator is operating within said first or second linear integrating range, said indication signal being a first predetermined potential whenever said integrator means is operating within said first saturated state and a second predetermined potential whenever said integrator means is operating within said second saturated state; and output means for comparing said indication signal with an applied reference signal, said output means developing an output signal of a first predetermined level when said indication signal is more positive than said reference signal and developing an output signal of a second predetermined level when said indication signal is more negative than said reference signal.

4. The timer circuit of claim 3 wherein said applied reference signal is a first predetermined negative voltage when said timer output signal is at said first predetermined output level and said reference voltage is a first predetermined positive voltage when said timer output signal is at said second predetermined output level.

5. The timer circuit of claim 4 further comprising means for controlling the integration rate of said integrator means in response to the polarity of said timer input signal, said control means establishing a first integration rate when said timer input signal is positive and a second integration rate when said timer input signal is negative.

6. A circuit for delaying an applied signal comprising:

an integrating circuit including an operational amplifier having noninverting and inverting input terminals and an output terminal, a capacitor connected between said amplifier output terminal and said amplifier inverting input terminal and a resistor connected between said inverting amplifier input terminal and the input terminal of said delay circuit;

means for establishing a predetermined voltage level at said amplifier inverting input terminal when said inverting input is not at virtual ground; and means responsive to said predetermined voltage level and an applied reference signal for developing an output voltage of a first potential when said predetermined voltage level is greater than said reference voltage and for developing an output voltage of a second potential when said predetermined voltage is less than said reference voltage.

7. The circuit of claim 6 wherein the polarity of said predetermined voltage at said inverting input is determined by the polarity of the input signal to said timer circuit.

8. The circuit of claim 7 wherein said reference signal is a predetermined fractional part of said output voltage.

9. A timer circuit comprising:

an integrator circuit including an operational amplifier having an inverting input terminal, a noninverting input terminal, an output terminal, and a capacitor connected between said operational amplifier inverting input terminal and said operational amplifier output terminal;

means for connecting said amplifier inverting input terminal to the input terminal of said timer circuit; and a comparator circuit for detecting the potential at said operational amplifier inverting input terminal, said comparator circuit having first and second comparator input terminals and an output terminal, said first comparator input terminal connected to said amplifier inverting input terminal and said second comparator input terminal supplied with a first reference voltage which is proportional to the output signal of said comparator.

10. The timer circuit of claim 9 wherein said means for connecting said amplifier inverting input terminal to said timer circuit input terminal includes control means, responsive to the polarity of the signal applied to said timer circuit input terminal, for controlling the integration rate of said integrator circuit.

11. The timer circuit of claim 9 further comprising a second comparator circuit having first and second input terminals and an output terminal, said second comparator first input terminal connected to said integrator amplifier output terminal, said second comparator second input terminal supplied with a second reference voltage which is representative of the output of said second comparator, said second comparator output terminal connected to said output terminal of said timer circuit, said means for connecting said amplifier inverting input terminal to said timer circuit input terminal including a logic circuit responsive to the signal applied to said timer circuit, responsive to the output of said comparator circuit, and responsive to the said output signal of said second comparator.

12. A time-delay circuit comprising:

first and second operational amplifiers, each having an inverting and noninverting input terminal and an output terminal, said inverting input terminals of said first and second amplifiers commonly connected, said noninverting input terminal of said first amplifier connected to a terminal of fixed potential;

a capacitor, connected between said first amplifier output terminal and said commonly connected inverting input terminals;

a first resistor connected between the input terminal of said time-delay circuit and said commonly connected inverting input terminals;

a second resistor connected between said commonly connected inverting input terminals and said terminal of fixed potential;

a third resistor connected between said second amplifier noninverting input terminal and said terminal of fixed potential; and a fourth resistor connected between said second amplifier output terminal and said second amplifier noninverting input terminal.

13. A time-delay circuit including means for restoring a predetermined minimum duty-cycle to an applied input signal comprising:

first and second operational amplifiers, each of said amplifiers including an inverting input terminal, a noninverting input terminal and an output terminal, said inverting input terminals commonly connected, and said noninverting input terminal of said first amplifier connected to a terminal of fixed potential;

a capacitor connected between said first amplifier output terminal and said commonly connected inverting input terminals;

a first resistor connected between said commonly connected amplifier inverting input terminals and said terminal of fixed potential;

a second resistor connected between said second amplifier noninverting input terminal and said terminal of fixed potential;

a third resistor connected between said second amplifier noninverting input terminal and said second amplifier output terminal;

a comparator circuit responsive to the signal level at said first amplifier output terminal and an applied reference signal, said comparator circuit output connected to the output terminal of said time delay circuit;

a logic circuit responsive to multiple input signals including the output of said second amplifier, the output of said comparator circuit, and the input signal to said time-delay circuit; and a fourth resistor for connecting the output of said logic circuit to said commonly connected inverting inputs of said first and second amplifiers.

14. The time-delay circuit of claim 13 wherein said logic circuit performs the operation described by the Boolean expression $V_A V_B + V_A V_C + \overline{V_A} V_B V_C$ where $V_A$, $V_B$, and $V_C$ are respectively representative of the voltage levels at said output terminal of said second amplifier, said input of said time-delay circuit, and said output of said comparator circuit.

15. The time-delay circuit of claim 14 wherein said comparator circuit includes a third operational amplifier having an inverting input, a noninverting input, and an output terminal, said inverting input of said third amplifier connected to the output terminal of said first amplifier, said third amplifier output terminal connected to said time-delay circuit output terminal, and said third amplifier noninverting input terminal connected to a reference signal which is developed from the output signal of said time-delay circuit.

16. The time-delay circuit of claim 15 wherein said comparator circuit reference signal is established by fifth and sixth resistors serially connected between two terminals of fixed potential and a seventh resistor connected between said comparator output terminal and the junction of said fifth and sixth resistors, the common junction of said fifth, sixth, and seventh resistors connected to the noninverting input terminal of said third operational amplifier.

* * * * *

UNITED STATES PATENT AND TRADEMARK OFFICE

CERTIFICATE OF CORRECTION

PATENT NO. : 3,889,197

DATED : June 10, 1975

INVENTOR(S) : Thomas G. Duff

It is certified that error appears in the above-identified patent and that said Letters Patent are hereby corrected as shown below:

Column 5, line 8, change "parameters to" to --parameters by--.

Column 6, line 24, change "Vos+ to Vos-" to --Vos- to Vos+--.

Signed and Sealed this

*third* Day of *February 1976*

[SEAL]

*Attest:*

RUTH C. MASON
*Attesting Officer*

C. MARSHALL DANN
*Commissioner of Patents and Trademarks*